Sept. 24, 1968 H. R. EISENHAND 3,402,712
PELLET IMPLANTER
Filed July 19, 1966 2 Sheets-Sheet 1
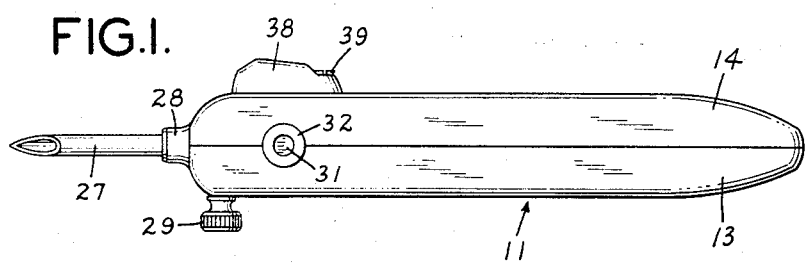
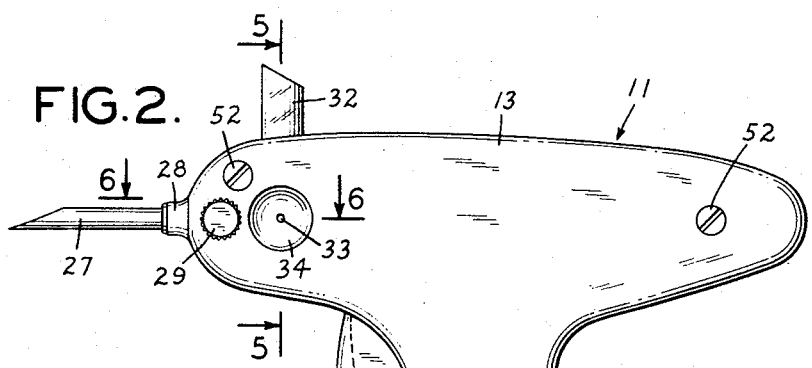
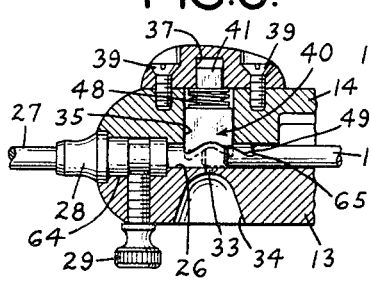
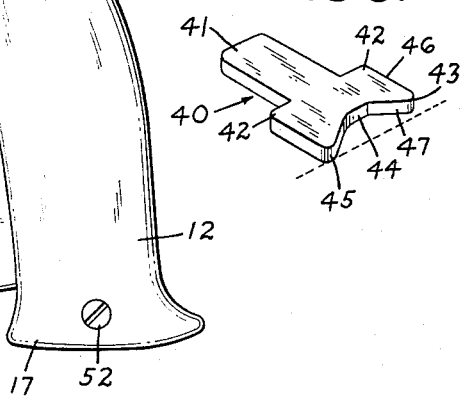
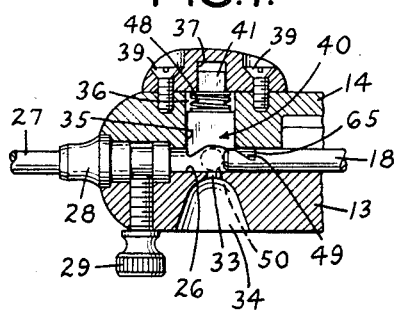
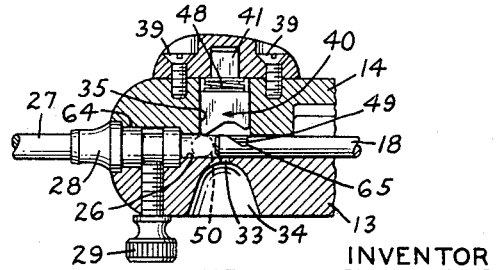
INVENTOR
HENRY R. EISENHAND
BY
Dwight J. Potter
ATTORNEY Sept. 24, 1968     H. R. EISENHAND     3,402,712
PELLET IMPLANTER
Filed July 19, 1966     2 Sheets-Sheet 2
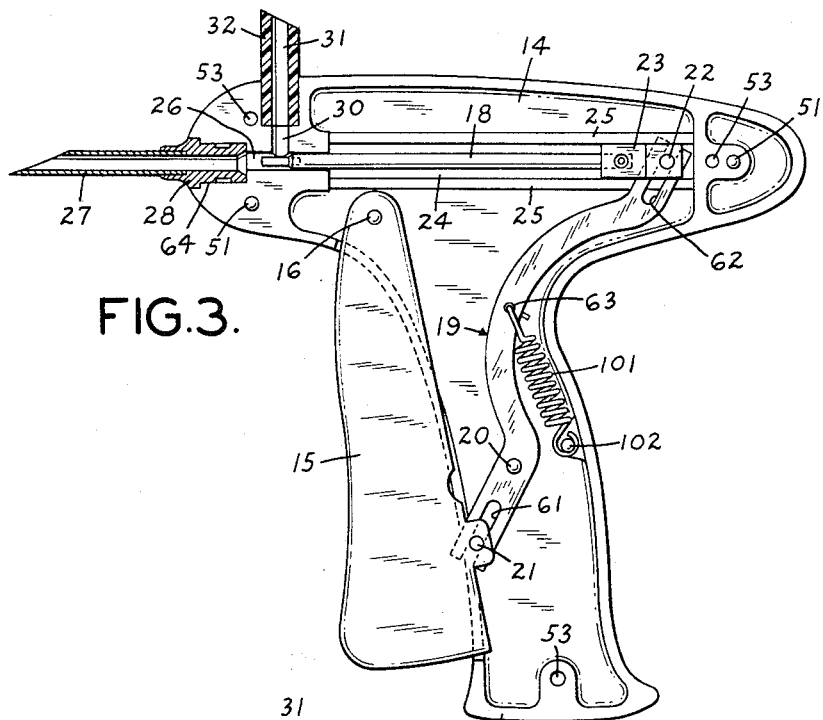
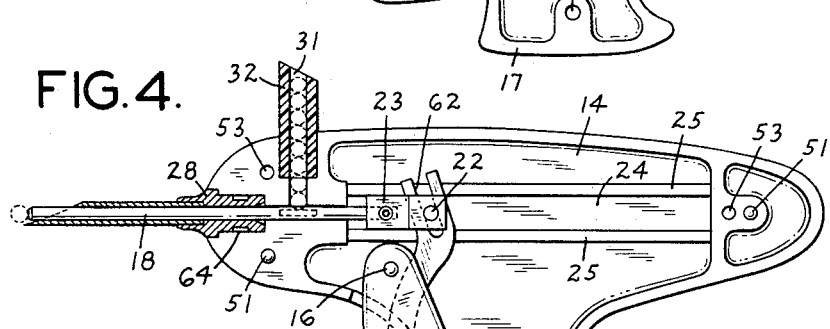
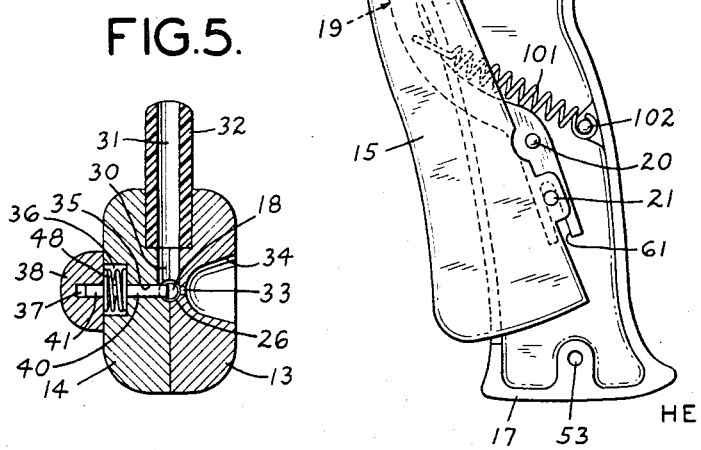
INVENTOR
HENRY R. EISENHAND
BY
Dwight J. Potter
ATTORNEY

United States Patent Office 3,402,712
Patented Sept. 24, 1968

3,402,712
PELLET IMPLANTER
Henry R. Eisenhand, Lakewood, Colo., assignor to American Home Products Corporation, New York, N.Y., a corporation of Delaware
Filed July 19, 1966, Ser. No. 566,331
6 Claims. (Cl. 128—217)

ABSTRACT OF THE DISCLOSURE

A gravity-feed pellet implanter has a tooth-engaging notch on the side of its plunger rod near its distal end, and a toothed cam extending into the plunger-containing bore and spring-biased against the notched side of the plunger; the toothed cam prevents advance of the plunger unless a pellet is in transport and prevents movement of pellets toward the needle unless the plunger is being advanced.

This invention relates to a pellet implanter especially suitable for use in implanting hormone pellets or other medicinals under the skin of domestic animals. It has been known for some time that implantation of a small pellet of material having estrogenic properties in a young steer causes the animal to utilize feedstuffs more effectively and to develop as a more desirable meat animal. Further, it has been a common practice to caponize immature cockerels by implanting estrogenic pellets in their necks. Diethylstilbestrol has been used as the preferred drug for these purposes.

A number of pellet implanters have been devised for the purpose of implanting rounded or spherical 15 mg. pellets of diethylstilbestrol in animals, but none of these has proven entirely satisfactory. Because stockmen ordinarily wish to treat a large number of animals with hormone pellets, a magazine-type of implanter is desired so that the implanter will not need to be reloaded after treating each animal. Furthermore, though implanting a single pellet in each animal to be treated is the usual practice, it is sometimes desired to implant two or even three pellets without withdrawing and re-inserting the needle. It is therefore important that the pellet implanter be extremely dependable in its action, so that each time the mechanism is operated a pellet is implanted. Because of the many distractions to which a stockman is likely to be subjected while using a pellet implanter, it is desirable that he should be able to tell easily by visual inspection whether the implanter is loaded with a pellet in the chamber ready for implanting.

It is accordingly an object of this invention to provide a pellet implanter which is convenient to use. A further object of this invention is to provide a pellet implanter which fits comfortably in the hand of the user. A still further object of the invention is to provide a pellet implanter provided with a transparent magazine to enable the user to see readily how large a supply of pellets is available in said magazine. Yet a further object of the invention is to provide a pellet implanter which permits visual determination whether a pellet is in the chamber ready to be implanted. A particularly important object of the invention is to provide a pellet implanter in which the mechanism will operate only when there is a pellet in the chamber ready for implanting. Other objects of the invention will be apparent from the description which follows:

The invention can be best understood by reference to the accompanying drawings, in which—

FIGURE 1 is a top plan view of my pellet implanter;
FIGURE 2 is a sinistral side elevation of a pellet implanter, showing in solid line position the implanter at rest and ready for use, and in dotted line position the trigger squeezed to urge the pellet-ejecting plunger into its forwardmost position;
FIGURE 3 is a sinistral side view of a pellet implanter with the sinistral half-shell removed and with the plunger in retracted position;
FIGURE 4 is similar to FIGURE 3 except that the pellet implanter is shown with the trigger squeezed and with the pellet-ejecting plunger advanced into its forwardmost position;
FIGURE 5 is a vertical section along line 5—5 of FIGURE 2;
FIGURE 6 is a plan view in section along line 6—6 of FIGURE 2;
FIGURE 7 is similar to FIGURE 6 and shows, in dotted line, a pellet in position ready for ejection;
FIGURE 8 is similar to FIGURES 6 and 7 but shows the pellet being ejected; and
FIGURE 9 is an enlarged detail of a portion of the locking mechanism of my pellet implanter.

Referring now to FIGURES 1 and 2, my pellet implanter comprises a body portion 11 having a grip portion 12. Said body is formed in two matching halves 13 and 14, 13 being hereinafter sometimes designated as the sinistral half-shell and 14 the dextral half-shell. As implied by the term half-shell, the matching halves of body portion 11 are hollowed out, in part, to accommodate the moving parts shown particularly in FIGURES 3 and 4. A trigger member 15 pivoted at 16 is mounted for motion in an opening in the distal face of body portion 11 extending from near the butt 17 to the vicinity of pivot post 16, which is mounted in dextral half-shell 14.

Motion of trigger member 15 as it is urged by squeezing into grip member 12 is translated into forward motion of plunger 18 by means of the lever 19 which is pivotally mounted on pivot post 20 mounted in dextral half-shell 14. Lever 19, as shown, is provided with open ended slots 61 and 62 at either end, which slots engage, respectively, pivot 21 mounted in the proximal edge of trigger member 15, and pivot 22, mounted in a block 23 in the distal end of which plunger 18 is rigidly mounted.

Tension of a coil spring 101 extending from a pin 102 mounted in half shell 14 to a hole 63 on lever 19 intermediate between pivot post 20 and the slot 62 engaging pivot 22 causes plunger 18 to remain in the retracted position of FIGURE 3 except when trigger 15 is urged back into grip portion 12 by squeezing.

Block 23 is adapted to travel slidingly in the track 24 defined by raised rails 25 and corresponding rails in sinistral half-shell 13.

Plunger 18 is adapted to slide in loose-fitted relationship in a pellet conduit 26 formed of matching hemicylindrical grooves in half-shells 13 and 14. Conduit 26 is co-axial with the lumen of hypodermic needle 27 provided with mounting ferrule 28 affixed thereto which is received in a cylindrical opening 64 at the distal end of body portion 11, which opening is defined by matching hemicylindrical grooves co-axial with conduit 26. Needle ferrule 28, bearing needle 27, is removably secured to body portion 11 by set screw 29 in sinistral half-shell 13. As well shown in FIGURES 3, 4, 6, 7, and 8, needle ferrule 28 is formed with an intermediate section of reduced diameter to facilitate securing of the needle to the implanter body by set screw 29.

A vertical pellet conduit 30 of cylindrical form communicates with and extends upwardly from the approximate mid-point of conduit 26. Extending vertically from conduit 30 and co-axially therewith is the internal passageway 31 of a generally cylindrical transparent tube 32 of dimensions suitable for frictional engagement with the neck of a bottle (not shown), which may preferably be of polyethylene, and capable of serving as a pellet magazine.

When a magazine bottle of pellets is affixed to upstanding tubular member 32, the pellets feed by gravity into and fill conduits 30 and 31 with a single line of pellets, as shown in dotted lines in FIGURE 4. And, when plunger 18 is in retracted position, one pellet will have passed down out of conduit 30 into conduit 26 and be ready for ejection, as shown, for example, in FIGURE 7.

In case the operator wishes to determine by visual inspection that a pellet is in place and ready for ejection, a sight hole 33 is provided in generally hemispherical cavity 34. This sight hole is positioned to permit view of a pellet located at the intersection of conduits 30 and 26. The dimensioning of sight hole 33 and cavity 34 are not critical, though it is evident that hole 33 should be small enough so that there will be no sideways displacement of a pellet thereinto, while large enough to allow a clear view of a pellet in place. Cavity 34, by reducing the thickness of the metal in which sight hole 33 is located, makes it easier to see through sight hole 33 into the chamber of the implanter. For a pellet implanter sized to handle the common 15 mg. pellets of diethylstilbestrol, a sight hole of $\frac{1}{16}$ inch diameter has proven satisfactory.

Opposite sight hole 33 (in sinistral half-shell 13) is a horizontal slit 35 in dextral half-shell 14, extending from the side of conduit 26 to a cylindrical cavity 36 in the outer face of dextral half-shell 14. Aligned with slit 35 is a narrower slit 37 in a cap member 38 removably affixed to dextral half-shell 14 by machine screws 39.

A yoke safety catch 40 (which may conveniently be stamped out of sheet metal), of which FIGURE 9 shows an enlarged view, is formed with a rearwardly extending shank 41 sized to fit slidably in the slit 37 in cap 38, and with shoulder portions enough water than shank 41 to prevent yoke 40 from passing through slit 37, but permitting yoke 40 to fit slidably in slit 35. Yoke 40 is furthermore formed with two forwardly extending corners 43 and 45 between which is an inwardly extending curvature as best seen in FIGURE 9. This curvature between points 43 and 45 may be composed of three straight-line segments, as shown, or may be a smooth curve. It is important that point 45 extend somewhat further forward than point 43, as is indicated by the dotted base line in FIGURE 9. Preferably edges 46 and 47 of yoke safety catch 40 intersect at (or near) point 43 at an angle of from about 45 to 60 degrees. The corners of yoke safety catch 40 are preferably rounded to a very small radius, such as $\frac{1}{64}''$ or less, as this results in somewhat smoother operation of the device.

As the pellet implanter is assembled, the yoke safety catch 40 rests in the slits 35 and 37, with a coil spring 48 under compression between shoulders 42 of yoke safety catch 40 and the inner face of cap 38 tending to urge points 43 and 45 of catch 40 inwardly and into pellet conduit 26. It will be seen from FIGURES 6, 7, and 8 that the deepest portion 44 of the concavity between points 43 and 45 is aligned with vertical pellet conduit 30.

Point 43 of safety catch 40 is adapted to serve as a click, and rests against the cylindrical surface of plunger 18 very near the forward end of said plunger when said plunger is in the retracted position, as can be seen in FIGURES 3 and 6. As will also be seen from the figures, the forward end of plunger 18 reaches just to, but not into, the intersection of conduits 26 and 30 when said plunger is in the retracted position.

As can be seen from FIGURES 6, 7, and 8, a notch 49 with a steep and essentially perpendicular wall 65 at its rear is formed in the dextral side of plunger 18 near its forward end; the sloping wall of this notch terminates at the exterior cylindrical surface of the plunger at a point just to the rear of the portion against which click point 43 of safety catch 40 rests when the plunger is in retracted position. Since safety catch 40 is continuously urged against plunger 18 by compressed coil spring 48, it will be seen that unless safety catch 40 is prevented somehow from engaging within notch 49, plunger 18 cannot be advanced. This is shown in FIGURE 6 which shows plunger and safety catch in solid lines in their position when the plunger is fully retracted, and in dotted lines in their locked position. However, if a generally spherically hormone pellet 50 is in place at the intersection of conduits 26 and 30, as shown in FIGURE 7, then as plunger 18 is advanced, it pushes pellet 50 ahead of it, causing the pellet to cam safety catch 40 back into slits 35 and 37 so that click point 43 does not engage notch 49; under these circumstances, plunger 18 may be advanced freely to push pellet 50 completely through needle 27. As is evident from the drawings, the half-shells of body portion 11 are provided with studs 51 in dextral half-shell 14 and matching recesses (not shown) in sinistral half-shell 13 to maintain proper positioning of the parts, and are held together by machine screws 52 threaded into screwholes 53.

While a container of hormone pellets is attached in inverted position to plastic tube 32, it will be evident that the pellets will pass by gravity into tube 32 and thence through conduit 30 to its intersection with conduit 26, and each time the trigger 15 is squeezed into grip 12, the plunger 18 will advance, pushing a pellet ahead of it which cams safety catch 40 away from plunger 18 so that the plunger is free to move through conduit 26 and needle 27 ejecting the pellet. When the last pellet has been expelled, safety catch 40 engages and locks in the notch 49 of plunger 18 after it has been advanced slightly, locking plunger 18 against further motion, and alerting the operator to the fact that a new supply of hormone pellets needs to be attached to the implanter.

The pellet implanter of this invention is extremely convenient for use in implanting hormone pellets into the necks of poultry or into the ears of cattle or other large meat animals. The operator can be certain that one pellet will be implanted each time the trigger is squeezed, and is notified of the exhaustion of the pellet supply by its being impossible then to squeeze the trigger. Also, by means of the sight-hole 33, it is possible to determine by visual inspection whether or not a pellet is in position for implanting.

Although the foregoing invention has been described in some detail by way of illustration and example for purposes of clarity of understanding, it is to be understood that certain changes and modifications may be practised within the spirit of the invention and the scope of the appended claims.

What is claimed is:

1. A pellet implanter comprising, in combination, a body member, a hollow injection needle mounted on said body member and extending forwardly therefrom, a pellet-conveying conduit in alignment with said hollow needle and extending rearwardly therefrom into said body member, a second pellet-conveying conduit within said body intersecting said first pellet-conveying conduit and extending at an angle thereto, means for introducing pellets into said second conduit from a pellet magazine, a plunger maintained in alignment with said needle and said first pellet-conveying conduit, said plunger being adapted for reciprocating motion through said first conduit and said needle whereby to eject pellets therethrough, the forward end of said plunger being contained within said first conduit when in its retracted position and reaching to the proximal side of said intersecting second conduit, hand-operable means for moving said plunger forward to advance a pellet completely through said needle, catch means retractably spring-urged into said first conduit and a capable, when in its spring-advanced position, of defining within said conduit a pellet-receiving space immediately forward of the distal end of said plunger when in its retracted position capable of containing a single pellet, said catch means being adapted, when in its advanced position, to obstruct advance of said pellet into said needle and being fitted with cammable means such that said catch means is adapted to be cammed out of said conduit by plunger-induced forward motion of said pellet, and locking means on said catch means engageable with said plunger whereby forward motion of said plunger is prevented unless it is ejecting said pellet.

2. A pellet implanter according to claim 1 in which the plunger is notched near its distal end and in which said notch is engageable by a corresponding tooth on the said catch means, said plunger, when in its retracted position, extending slightly beyond said tooth and said notch being slightly behind said tooth.

3. A pellet implanter according to claim 1 in which said catch means is slidably mounted in a horizontal passageway perpendicular to both said pellet-conveying conduits and communicating with both at their intersection.

4. A pellet implanter according to claim 1 in which said catch means is directly urged into said first conduit by a coil spring under compression.

5. A pellet implanter according to claim 1 in which the said catch means is urged into said first conduit by a coil spring pressing against a removable spring housing.

6. A pellet implanter according to claim 1 having a sight hole extending through the body member into said first pellet-conveying conduit at its point of intersection with said second pellet-conveying conduit, whereby a pellet in place and ready for implantation is visible.

References Cited

UNITED STATES PATENTS

| | | | |
|---|---|---|---|
| 2,659,369 | 11/1953 | Lipman | 128—217 |
| 2,883,984 | 4/1959 | Candido et al. | 128—217 |
| 3,030,953 | 4/1962 | Koehn | 128—221 XR |
| 3,058,465 | 10/1962 | Bell | 128—217 |

FOREIGN PATENTS 253,175   7/1964   Australia.

RICHARD A. GAUDET, *Primary Examiner.*

M. F. MAJESTIC, *Assistant Examiner.*